(12) United States Patent
Eriksen (10) Patent No.: US 10,138,712 B2
(45) Date of Patent: Nov. 27, 2018

(54) SUBSEA ELECTRICAL UNIT AND SYSTEM

(71) Applicant: Siemens Aktiengesellschaft, München (DE)

(72) Inventor: Mikael Kristian Eriksen, Trondheim (NO)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 403 days.

(21) Appl. No.: 14/781,623

(22) PCT Filed: Apr. 8, 2014

(86) PCT No.: PCT/EP2014/057066
§ 371 (c)(1),
(2) Date: Oct. 1, 2015

(87) PCT Pub. No.: WO2014/180615
PCT Pub. Date: Nov. 13, 2014

(65) Prior Publication Data
US 2016/0053587 A1  Feb. 25, 2016

(30) Foreign Application Priority Data

May 8, 2013  (EP) .................................. 13167077

(51) Int. Cl.
*E21B 33/035*  (2006.01)
*E21B 41/00*  (2006.01)
*H02H 11/00*  (2006.01)
*H02H 3/17*  (2006.01)

(52) U.S. Cl.
CPC .......... *E21B 41/00* (2013.01); *E21B 33/0355* (2013.01); *H02H 11/001* (2013.01); *H02H 3/17* (2013.01)

(58) Field of Classification Search
CPC .. E21B 33/0355; E21B 41/00; E21B 41/0007; H02H 3/17; H02H 11/001
See application file for complete search history.

(56) References Cited

U.S. PATENT DOCUMENTS

| 4,410,925 A | 10/1983 | Tucker et al. |
| 6,420,976 B1 | 7/2002 | Baggs et al. |

(Continued)

FOREIGN PATENT DOCUMENTS

| EP | 2339359 A2 | 6/2011 |
| EP | 2339359 A2 | 6/2011 |

(Continued)

OTHER PUBLICATIONS

International Search Report PCT/ISA/210 for International Application No. PCT/EP2014/057066 dated May 19, 2014.

(Continued)

*Primary Examiner* — Matthew R Buck
(74) *Attorney, Agent, or Firm* — Harness, Dickey & Pierce, P.L.C.

(57) ABSTRACT

A subsea electrical unit is provided. The subsea electrical unit includes a first electric power connection for receiving electric power for operating the subsea electrical unit and a second electric power connection towards a further subsea electrical unit. A line insulation monitor is coupled to the second electric power connection. A control unit is adapted to determine whether electric power is present on the second electric power connection, and is further adapted to disconnect the line insulation monitor form the second electric power connection if it determines that power is present on the second electric power connection.

19 Claims, 6 Drawing Sheets

(56) References Cited

U.S. PATENT DOCUMENTS

| | | | |
|---|---|---|---|
| 8,532,120 B2* | 9/2013 | Brekke | H04L 45/00 |
| | | | 348/575 |
| 8,773,277 B2* | 7/2014 | Brekke | H04L 49/353 |
| | | | 340/850 |
| 2009/0288836 A1 | 11/2009 | Goodall et al. | |
| 2010/0220431 A1* | 9/2010 | Douglas | H01H 71/66 |
| | | | 361/622 |
| 2011/0291661 A1 | 12/2011 | Stokes | |
| 2011/0298467 A1* | 12/2011 | Douglas | E21B 41/0007 |
| | | | 324/509 |
| 2013/0202285 A1 | 8/2013 | Lecroart et al. | |
| 2013/0268216 A1* | 10/2013 | Dalban Pilon | G01R 31/08 |
| | | | 702/58 |
| 2013/0300491 A1* | 11/2013 | Boe | H01H 9/548 |
| | | | 327/365 |

FOREIGN PATENT DOCUMENTS

| | | | |
|---|---|---|---|
| EP | 2390460 | A2 | 11/2011 |
| EP | 2390460 | A2 | 11/2011 |
| EP | 2390675 | A2 | 11/2011 |
| EP | 2390675 | A2 | 11/2011 |
| GB | 2332220 | A | 6/1999 |
| GB | 2332220 | A | 6/1999 |
| GB | 2460170 | A | 11/2009 |
| GB | 2460170 | A | 11/2009 |
| GB | 2463487 | A | 3/2010 |
| GB | 2463487 | A | 3/2010 |
| WO | WO-2011151158 | A1 | 12/2011 |
| WO | WO 2011151158 | A1 | 12/2011 |
| WO | WO 2012036297 | A1 | 3/2012 |
| WO | WO-2012038237 | A1 | 3/2012 |

OTHER PUBLICATIONS

Written Opinion of the International Searching Authority PCT/ISA/237 for International Application No. PCT/EP2014/057066 dated May 19, 2014.

Extended European Search Report dated Oct. 11, 2013.

International Search Report and Written Opinion dated Jun. 3, 2015.

* cited by examiner

SUBSEA ELECTRICAL UNIT AND SYSTEM

PRIORITY STATEMENT

This application is the national phase under 35 U.S.C. § 371 of PCT International Application No. PCT/EP2014/057066 which has an International filing date of Apr. 8, 2014, which designated the United States of America and which claims priority to European patent application number EP13167077.0 filed May 8, 2013, the entire contents of which are hereby incorporated herein by reference.

FIELD

At least one embodiment of the invention generally relates to a subsea electrical unit, to a subsea electrical system comprising two or more subsea electrical units and/or to a method of operating a subsea electrical unit.

BACKGROUND

Due to the increasing energy demand, offshore oil and gas production is moving into deeper waters. For ensuring an efficient and secure production, processing facilities are being installed at the ocean floor. Recent subsea installations include an increasing amount of electrical equipment, including electrical components installed at the wellhead and Christmas tree, such as actuators and sensors. Furthermore, electrically driven compressors and/or pumps may be provided at a subsea installation.

For operating such electrical equipment, communication and control is required, as well as the supply of electric power. Communication and the supply with electric power may occur via an umbilical from a topside installation, or via a subsea cable. A modem diplexer unit (MDU) may for example be provided for communicating with a topside installation, and well control units (WCU) or other subsea control units may be provided, e.g. for controlling equipment at a well head or the like.

When several such subsea electrical devices or units are installed, they need to be electrically connected for receiving power and for communication purposes. Cables, such as subsea jumper cables and oil filled hoses in which conductors are arranged are used for this purpose. Such electric connections generally constitute a weak link. Water ingress into such subsea cable or hose may cause a failure of insulation, which in turn can lead to a short circuit between the conductors provided in the cable or the hose, or may result in the flow of current from an electric power carrying cable or conductor to ground (earth or ground fault). Also, a fault may occur inside subsea electric equipment. The occurrence of such failure or fault can jeopardize the operation of the whole subsea installation.

A particular difficulty lies in finding the location of the failure of fault, and in isolating the failure or fault so that operation of the remaining subsea installation can continue. Trying to detect and find the location of a failure or fault from a topside installation is generally difficult, since galvanic isolation may be provided between topside and subsea electric systems, for example due to the presence of a transformer or the like. One possibility is the use of line insulation monitors (LIMs) for detecting a degradation of the insulation resistance. If more than one LIM is provided, the LIM measurements interfere with each other, resulting in inaccurate current readings. Furthermore, the LIMs consume electric power, resulting in an increased power demand and an increase in heat production, the waste heat being difficult to dispose of in subsea control units.

SUMMARY

Accordingly, the inventors have recognized that there is a need for improving the detection of a failure of insulation in subsea electrical equipment, and of mitigating at least some of the drawbacks mentioned above.

This need is met by the features of the independent claims of at least one embodiment. The dependent claims describe further embodiments of the invention.

An embodiment of the invention provides a subsea electrical unit comprising a first electric power connection for receiving electric power for operating the subsea electrical unit and a second electric power connection towards a further subsea electrical unit. The subsea electrical unit further comprises a (second) line insulation monitor coupled to the second electric power connection and a control unit adapted to determine whether electric power is present on the second electric power connection. The control unit is adapted to disconnect the line insulation monitor from the second electric power connection if it determines that power is present on the second electric power connection.

A further embodiment of the invention provides a subsea electrical system comprising at least a first and a second subsea electrical unit configured in accordance with any of the above described embodiments and configurations. Each subsea electrical unit comprises a further line insulation monitor coupled to the first electric power connection, wherein the control unit of each subsea electrical unit is adapted to determine whether electric power is present on the first electric power connection and, if this is the case, to disconnect the further line insulation monitor from the first electric power connection. The subsea electrical system further comprises a subsea cable or hose connecting the first and second subsea electrical units, wherein the subsea cable or hose provides the second electric power connection of the first subsea electrical unit and the first electric power connection of the second subsea electrical unit. The subsea electrical system thus has effectively a series connection of at least two subsea electrical units. The second subsea electrical unit may for example be powered through the first subsea electrical unit by way of the above mentioned power switch. In case of a failure in insulation resistance, the LIMs coupled to the different electric power connections can thus be used to locate the fault, and by opening respective power switches, the fault can be isolated.

Another embodiment of the invention provides a method of operating a subsea electrical unit. The subsea electrical unit has a first electric power connection for receiving electric power, a second electric power connection towards a further subsea electrical unit, and a line insulation monitor connected to the second electric power connection. The method comprises the steps of receiving power on the first electric power connection for operating the subsea electrical unit, determining if electric power is present on the second electric power connection, and, if electric power is present on the second electric power connection, disconnecting the line insulation monitor from the second electric power connection. The steps of determining and disconnecting may for example be performed by way of a control unit of the subsea electrical unit. With such method, advantages similar to the ones outlined further above with respect to the subsea electrical unit may be achieved.

BRIEF DESCRIPTION OF THE DRAWINGS

The foregoing and other features and advantages of the invention will become further apparent from the following detailed description read in conjunction with the accompanying drawings. In the drawings, like reference numerals refer to like elements.

DETAILED DESCRIPTION OF EXAMPLE EMBODIMENTS

An embodiment of the invention provides a subsea electrical unit comprising a first electric power connection for receiving electric power for operating the subsea electrical unit and a second electric power connection towards a further subsea electrical unit. The subsea electrical unit further comprises a (second) line insulation monitor coupled to the second electric power connection and a control unit adapted to determine whether electric power is present on the second electric power connection. The control unit is adapted to disconnect the line insulation monitor from the second electric power connection if it determines that power is present on the second electric power connection.

By using the line insulation monitor in the subsea electrical unit, a failure in the insulation of the electrical connection or an earth leakage can be identified and located. Since the line insulation monitor (LIM) is disconnected from the second electrical power connection, for example when electric power is being transmitted between the subsea electrical unit and the further subsea electrical unit, interference between several LIMs can be prevented. It thus becomes possible to provide LIMs in several connected subsea electrical units, without compromising the accuracy of the detection of a failure in the insulation. If the further units are configured similarly to the subsea electrical unit of the present embodiment, the simultaneous operation of plural LIMs on the same electric connection can be prevented. By disconnecting the LIM from the power connection, interference caused by the LIM when it is offline (i.e. inactive and not taking measurements) may also be prevented. The precision of failure detection by a LIM on an electric connection on which several offline LIMs are present may thus also be improved, when the respective electric units are configured in accordance with the present embodiment.

According to an embodiment of the invention, the subsea electrical unit comprises a further line insulation monitor coupled to the first electric power connection, wherein the control unit is adapted to determine whether electric power is present on the first electric power connection and wherein the control unit is adapted to disconnect the further line insulation monitor from the first electric power connection if it determines that power is present on the first electric power connection. Accordingly, also for the first electric power connection, it may thus become possible to accurately measure insulation resistance while preventing interference of several LIMs. As an example, if the subsea electrical unit as a power switch between the first and second electric power connections which is open, and electric power is supplied via the second electric power connection, the further LIM can be operated to detect a failure, e.g. degraded insulation resistance or earth leakage, for the first electric power connection. The further LIM can be termed first LIM since it is coupled to the first electric power connection.

In an embodiment, disconnecting the line insulation monitor from the second electric power connection comprises disconnecting the line insulation monitor from a ground line of the second electric power connection. In operation, the LIM may for example induce a DC component to ground to measure insulation. When multiple LIMs are present, each inducing such DC component into the same line, they will interfere with each other and result in inaccurate readings. Accordingly, disconnecting the LIM from the ground line may avoid such interference. Also, in a situation in which an LIM is in a offline mode (i.e. not taking any measurements on insulation resistance), it may still interfere with another LIM which is in an online mode (takes measurements of insulation resistance). By disconnecting the LIM from the ground line, such interference can be avoided, so that more accurate measurements of insulation resistance become possible compared to a configuration in which the LIMs are only put in an offline mode and not disconnected.

In an embodiment, the control unit is further adapted to stop the supply of operating power to the line insulation monitor if it determines that power is present on the second electric power connection. The power consumption of the subsea electrical unit can thus be reduced, as well as the production of waste heat.

The subsea electrical unit may for example comprise a power supply connection from the control unit to the line insulation monitor for supplying operating power from the control unit to the line insulation monitor for operating the line insulation monitor. The control unit may then be adapted to disconnect the power supply connection from a power source if it determines that power is present on the second electric power connection, e.g. by using a switch, such as a relay.

The control unit may comprise a switch, in particular a relay, connected between the second electric power connection and the line insulation monitor. The control unit may then open the switch to disconnect the LIM from the second electric power connection if it detects the presence of electric power thereon.

The control unit may for example comprise a power sensing circuit for measuring the presence of electric power on the second electric power connection. It may for example perform a voltage measurement. In other configurations, determining the presence of electric power may be achieved by determining the switching state of switches within the subsea electrical unit, the control unit may for example derive the presence of electric power from the fact that a power switch within the subsea electrical unit is closed.

The subsea electrical unit may comprise a power switch for connecting the first electric power connection to the second electric power connection. This way, the subsea electrical unit may be operable to distribute electric power to further downstream subsea electrical units, connected e.g. via the second electric power connection. Downstream means connected further away from the power source. Accordingly, by closing the power switch, a downstream subsea electrical unit can be supplied with electric power, while by opening the power switch, a downstream subsea electrical unit can be disconnected from the power source.

In an embodiment, the first electric power connection and the second electric power connection each are a connection to a further subsea electrical unit and each is configured for transmitting electrical power between the subsea electrical unit and the respective further subsea electrical unit. Accordingly, by way of the first and the second electric power connections, plural subsea electrical units can be connected in a chain configuration. By such series connection, each subsea electrical unit may be supplied with electric power.

Transmitting electric power means receiving and/or supplying electric power, so that such chain configuration of subsea electrical units can be powered from both sides, i.e. each subsea electrical unit may be supplied with electric power from either side, depending on the switching state. A redundant connection to a power source can thus be achieved.

The control unit may be configured similarly for the (second) LIM and for the further (first) LIM, it may in particular comprise a switch (e.g. relay) for disconnecting the further LIM from a ground line and from the power supply, and it may comprise a power sensing circuit for determining the presence of electric power on the first electric power connection. The LIM connected to the second electric power connection is herein also termed "second LIM", while the further LIM connected to the first electric power connection is also termed "first LIM".

In an embodiment, the subsea electrical unit may be a subsea well control unit (WCU) or a subsea modem diplexer unit (MDU). If configured as an MDU, the subsea electrical unit may for example be coupled to an umbilical via the first electric power connection for receiving electric power. If configured as a WCU, the subsea electrical unit may for example be coupled on one side to an MDU and on the other side to a WCU, or may be connected between two WCUs by way of the first and second electric power connections.

In an embodiment, the subsea electrical unit is a subsea control unit, in particular a WCU, configured to receive electric power on one of the first and second electric power connections, and to supply electric power via the other of the first and second electric power connections.

This may for example be done by way of the above mentioned power switch.

The first and/or second electric power connections may for example be provided by a subsea cable or a liquid (in particular oil) filled hose comprising conductors (herein termed subsea hose) between the respective subsea electrical units.

A further embodiment of the invention provides a subsea electrical system comprising at least a first and a second subsea electrical unit configured in accordance with any of the above described embodiments and configurations. Each subsea electrical unit comprises a further line insulation monitor coupled to the first electric power connection, wherein the control unit of each subsea electrical unit is adapted to determine whether electric power is present on the first electric power connection and, if this is the case, to disconnect the further line insulation monitor from the first electric power connection. The subsea electrical system further comprises a subsea cable or hose connecting the first and second subsea electrical units, wherein the subsea cable or hose provides the second electric power connection of the first subsea electrical unit and the first electric power connection of the second subsea electrical unit. The subsea electrical system thus has effectively a series connection of at least two subsea electrical units. The second subsea electrical unit may for example be powered through the first subsea electrical unit by way of the above mentioned power switch. In case of a failure in insulation resistance, the LIMs coupled to the different electric power connections can thus be used to locate the fault, and by opening respective power switches, the fault can be isolated.

In an embodiment, the subsea electrical system further comprises at least one subsea terminating device, such as the above mentioned MDU, which has an electrical connection to a power source in form of a subsea cable or an umbilical. The first electrical power connection of the first subsea electrical unit is connected to the subsea terminating device for receiving electric power from the power source. It should be clear that further components may be provided in such connection of subsea units and devices, for example an umbilical termination unit or a subsea transformer connected between the subsea terminating device and the umbilical or subsea cable.

In an embodiment, at least the first and the second subsea electrical units are connected in series between the first subsea terminating devices and a second subsea terminating device. The subsea electrical units are configured to enable a supply of electric power to each subsea electrical unit from either the first or the second subsea terminating device. Accordingly, by way of such series connection of two or more subsea electrical units between the first and second subsea terminating devices, it is possible to supply electric power for operation to each subsea electrical unit from either side. A power switch in each subsea electrical unit can be used to break the chain at a desired point. In operation, power is supplied from both sides via the first and second subsea terminating devices and the chain is open at one point.

A first part of the subsea electrical units can be supplied via the first subsea terminating device, and a second part of the subsea electrical units can be supplied via the second subsea terminating device. If the supply with electric power via one of the subsea terminating devices is interrupted, the configuration can be changed by closing respective power switches so as to supply the disconnected subsea electrical units via the other subsea terminating device with electric power. Due to the presence of the LIMs coupled to the electric power connections in such chain configuration, the location of a fault, in particular a failure in insulation or an earth leakage, may be easily detected and isolated.

The second subsea terminating device can be configured similarly to the first subsea terminating device, it may in particular have an electrical connection to a power source in form of a subsea cable or an umbilical. The second subsea terminating device may be connected to the second electric power connection of a subsea electrical unit, such as the second subsea electrical unit or a further subsea electrical unit having a configuration according to any of the above outlined embodiments.

In an embodiment, the subsea terminating device has a line insulation monitor coupled to the first electrical power connection of the first subsea electrical unit. The LIM is configured to be operable online while the subsea electrical units which are electrically connected to the first subsea terminating device receive electric power via the subsea terminating device and the respective electric power connections. In operation, the LIM of the subsea terminating device can thus be online and can monitor the electric connections between the subsea electrical units with respect to insulation resistance and earth leakage. This can be done at relatively high accuracy, since the LIMs within the subsea electrical units are disconnected from the respective electric power connections, via which electric power is transmitted. Subsea electrical units further downstream of the subsea electrical unit at which the chain is open, e.g. by opening a power switch thereof, are no longer electrically connected to the first subsea terminating device, and their connection are thus also not monitored by the LIM of the first subsea terminating device. These downstream subsea electrical units are rather provided with electric power via the second subsea terminating device, which may also comprise a corresponding LIM which may monitor the corresponding electric power connections.

Another embodiment of the invention provides a method of operating a subsea electrical unit. The subsea electrical unit has a first electric power connection for receiving electric power, a second electric power connection towards a further subsea electrical unit, and a line insulation monitor connected to the second electric power connection. The method comprises the steps of receiving power on the first electric power connection for operating the subsea electrical unit, determining if electric power is present on the second electric power connection, and, if electric power is present on the second electric power connection, disconnecting the line insulation monitor from the second electric power connection. The steps of determining and disconnecting may for example be performed by way of a control unit of the subsea electrical unit. With such method, advantages similar to the ones outlined further above with respect to the subsea electrical unit may be achieved.

In embodiments of the method, the subsea electrical unit may be configured in accordance with any of the above outlined embodiments.

In an embodiment of the method, the method may further comprise the step of disconnecting the power supply to the line insulation monitor if electric power is present on the second electric power connection. Electric power consumption by the subsea electrical unit may thus be reduced, as well as the generation of waste heat.

In a further embodiment of the method, the method is performed by a subsea electrical system in accordance with any of the above outlined embodiments. The method may further comprise the steps of operating the subsea electrical system with the line insulation monitor of the subsea terminating device being online; upon detection of a failure by the line insulation monitor of the subsea terminating device, disconnecting each subsea electrical unit from the subsea terminating device by opening respective switches in the subsea terminating device and the subsea electrical units; re-connecting the subsea electrical units to the subsea terminating device by connecting each subsea electrical unit one after the other, starting with the subsea electrical unit closest to the subsea terminating device and continuing downstream, and, before re-connecting a subsea electrical unit, using the line insulation monitor of the subsea terminating device or of the subsea electrical unit arranged upstream of the subsea electrical unit to be re-connected to check if the electric power connection towards the subsea electrical unit to be re-connected for a failure.

Upstream means located closer to the power source. A failure may for example be a degraded or too low insulation resistant, an earth leakage or the like.

For example, after all subsea electrical units were disconnected from the subsea terminating device, the LIM of the subsea terminating device may be used to check the electric power connection to the first subsea electrical unit, and after reconnection thereof, the LIM of the first subsea electrical unit may be used to check the second electric power connection thereof towards the second subsea electrical unit. If this scheme is continued, the failure will be located efficiently, and can be isolated. In particular, the electric power connection at which the fault occurred does not need to be used, since electric power can be supplied to the subsea electrical units on both side of the faulty electric power connection by way of the first and second subsea terminating devices. Embodiments of the method can thus be efficient in identifying, locating and isolating failures in electric connections between such subsea electrical units.

The features of the embodiments of the invention mentioned above and those yet to be explained below can be combined with each other unless noted to the contrary. In particular, the subsea electrical unit and the subsea electrical system may be configured as described with respect to embodiments of the method, whereas the method may be performed by way of a subsea electrical unit or a subsea electrical system in any of the above outlined configurations.

In the following, embodiments of the invention will be described in detail with reference to the accompanying drawings. It is to be understood that the following description of the embodiments is given only for the purpose of illustration and is not to be taken in a limiting sense.

The drawings are to be regarded as being schematic representations only, and elements in the drawings are not necessarily to scale with each other. Rather, the representation of the various elements is chosen such that their function and general purpose become apparent to a person skilled in the art. It is also to be understood that the coupling of physical or functional units as shown in the drawings and described hereinafter does not necessarily need to be a direct connection or coupling, but may also be an indirect connection or coupling, i.e. a connection or a coupling with one or more additional intervening elements. The skilled person will further appreciate that the physical or functional units illustrated and described herein with respect to the different embodiments do not necessarily need to be implemented as physically separate units. One or more physical or functional blocks or units may be implemented in a common circuit, chip, circuit element or unit, while other physical or functional blocks or units may be implemented in separate circuits, chips, circuit elements or units.

Figure 1:
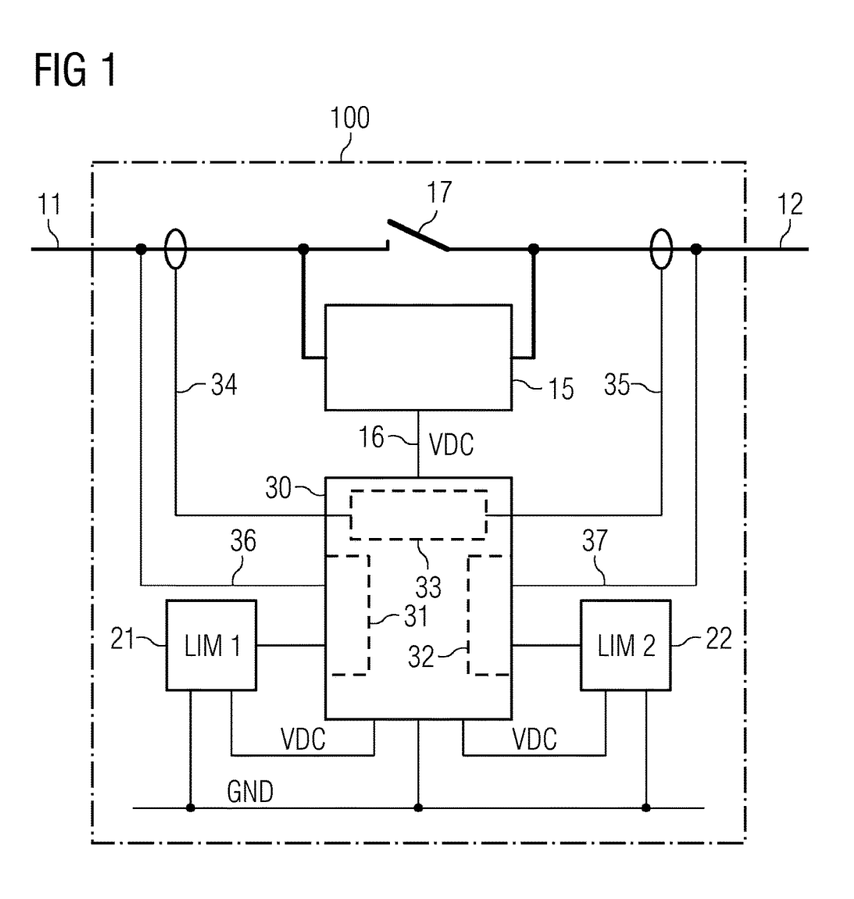
FIG. 1 shows a schematic block diagram of a subsea electrical unit according to an embodiment of the invention.

FIG. 1 is a schematic block diagram of a subsea electrical unit 100 according to an embodiment of the invention. Subsea electrical unit 100 may for example be a subsea control unit or module, in particular a well control unit (WCU). The description is given hereinafter with respect to a subsea electrical unit 100 in form of a WCU, yet the skilled person will appreciate that the teachings of the present application are equally applicable to other types of subsea electrical units, in particular other types of subsea control units or modules.

The subsea electrical unit 100 has a first electric power connection 11 for receiving electric power for operating the subsea electrical unit 100. It has a second electric power connection 12 towards a further subsea electrical unit. The second electric power connection 12 can also be configured for receiving electric power for operating the subsea electrical unit 100. Also, the first electric power connection 11 may be connected to a further subsea electrical unit, e.g. to another WCU, to an MDU or the like. A power switch 17 is provided for connecting the first electrical power connection 11 to the second electrical power connection 12. This way, electric power received on one of the electric power connections (e.g. 11) can be provided to a downstream subsea electrical unit connected to the other of the electric power connections (e.g. 12). Plural subsea electrical units 100 can thus be connected in a chain configuration, with power received at one end and distributed along the chain to the different subsea electrical units. This is for example illustrated in FIGS. 2 and 3.

The general circuitry of the subsea electrical unit 100 is in FIG. 1 schematically illustrated with block 15. This may for example comprise the circuitry for performing the general control and communication functions of a well control unit, i.e. the WCU circuitry. The general purpose and function of such circuitry is known to the skilled person and will not be elaborated in more detail here.

As can be seen from FIG. 1, this circuitry 15 can be powered either via the first electric power connection 11 or the second electric power connection 12, also when power switch 17 is open. By enabling a power supply with electric power from two sides of such chain, a redundancy in the power supply is achieved, and the availability of the subsea electrical unit 100 can be improved.

Failures in the electrical insulation of the electric power connections 11, 12 can result in short circuits or in current leakages to ground (earth leakage), and may lead to a blackout of the electrical system of a subsea installation which comprises the subsea electrical unit 100. To monitor the integrity of electrical connections and to detect such failures, the subsea electrical unit 100 comprises a first line insulation monitor (LIM1) 21 and a second line insulation monitor (LIM2) 22. Such LIM may for example operate by inducing a DC component to ground to measure insulation. As an example, the DC voltage may be applied between the ground conductor and one of the phase conductors (phase wire or life wire), and the resistance may be measured for deriving the status of the insulation. As an example, 20 V DC may be applied to the ground conductor. Accordingly, if several LIMs are performing measurements on the same line, they will interfere with each other which results in inaccurate readings. Even if operated in an offline mode, in which the LIMs do not take measurements, the LIMs still use power and further still interfere with an LIM which operates in an online mode and takes measurements (e.g. a LIM provided in a modem diplexer unit (MDU)).

To prevent such interference, the subsea electrical unit 100 comprises a control unit 30. Control unit 30 determines whether electric power is present on the first and second electric power connections 11 and 12. Control unit 30 may for example detect voltage or current on the respective electric power connections as schematically illustrated with the electric power sensing circuits 34 and 35. Reference numeral 33 denotes the power sensing circuitry which performs measurements on the first and second electric power connections 11 and 12 from which the presence of electric power on these connections can be derived.

Control unit 30 is configured to disconnect the first LIM 21 from the first electric power connection 11 if electric power is present on the first electric power connection 11, and to disconnect the second LIM 22 from the second electric power connection 12 if electric power is present on the second electric power connection 12.

In an operating state in which power is forwarded by closing the power switch 17, both LIMs 21, 22 would accordingly be disconnected. An LIM located in an MDU may thus take measurements without interference from the LIMs in a subsea electrical unit 100, in particular in a WCU. On the other hand, if power switch 17 is open and no power is present on the second electric power connection 12, the LIM 22 may take measurements to detect a degradation of the insulation or an earth leakage or the like.

In an embodiment, disconnecting the LIMs 21, 22 from the electric power connection 11, 12 occurs by disconnecting the connection of the respective LIM to the ground conductor. This way, the LIM can no longer inject a DC voltage into the ground conductor, thus removing the source of interference. Connections to the phase conductors or life wires can remain connected. Disconnecting may for example be performed by switches 31, 32 provided in control unit 30, for example by way of relays.

In FIG. 1, the electric connections 36, 37 illustrate the connections of the control unit 30 to the conductors of the respective electric power connections 11 and 12. Note that in some embodiments, the LIM 21, 22 may be directly connected to the phase conductors of the electric power connections 11, 12, while in other embodiments, also the connections to the phase conductors may be switched by switches 31, 32 provided in control unit 30.

Furthermore, if power is detected on the electric power connections 11, 12, the control unit 30 is configured to disconnect the respective LIM 21 or 22 from the power supply. As illustrated in FIG. 1, the control unit 30 may receive electric power for operation via a connection 16 to the general circuitry 15, and may distribute electric power to the LIM 21, 22 (see connection VDC). As an example, a voltage of 24 V DC may be provided by the control unit 30 to the LIM 21 and 22. Using corresponding switches or relay circuitry, the control unit 30 can cut off the power supply to the LIMs 21, 22, thereby reducing the power consumption of the subsea electrical unit 100 and furthermore, reducing the waste heat that is generated within the subsea electrical unit 100.

Figure 2:
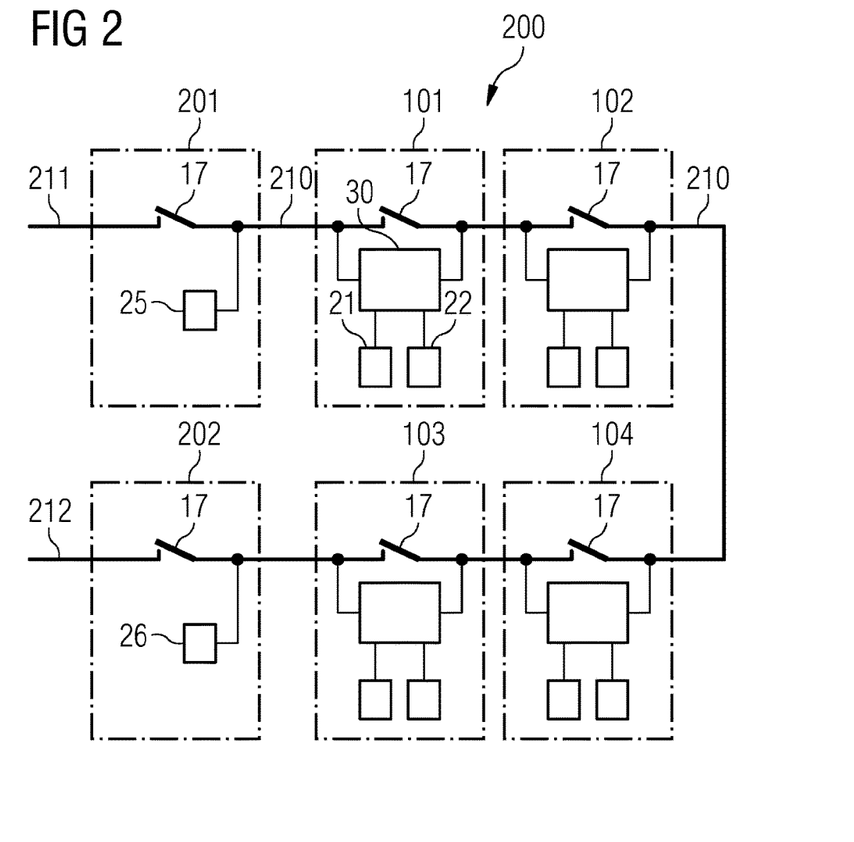
FIG. 2 is a schematic block diagram which illustrates a subsea electrical system in accordance with an embodiment of the invention.

FIG. 2 illustrates a subsea electrical system 200 according to an embodiment of the invention. The subsea electrical system 200 may comprise plural subsea electrical units 100 as illustrated in FIG. 1 and described in the preceding paragraphs. It may for example comprise two, three, four or more subsea electrical units 100. In the example of FIG. 2, these units are implemented as WCUs, and the system 200 comprises the WCUs 101, 102, 103 and 104. For the purpose of a comprehensive presentation, only the LIMs 21, 22 and the control unit 30 are schematically shown in each WCU. Even though, it should be understood that each WCU can be configured similar to the subsea electrical unit 100 of FIG. 1, so the explanations given above are equally applicable.

The subsea electrical system 200 further comprises the two subsea terminating devices 201 and 202, which may for example be modem diplexer units (MDUs). As illustrated, the MDUs 201, 202 and the WCUs 101 to 104 are connected in a chain. The electric power connections 210 can be provided by the above mentioned first and second electric power connections of the respective subsea electrical unit and can be implemented by a subsea cable (e.g. a jumper cable), a liquid filled hose or the like.

The MDUs 201 and 202 can receive electric power from an umbilical power line via the electrical connections 211 and 212. As an example, the umbilical may be terminated in an umbilical termination unit, and the electric connections 211 and 212 may be provided by jumper cables connected to such umbilical termination unit. Accordingly, in such configuration, each WCU 101 to 104 can be supplied with electric power from either side, i.e. via the MDU 201 or the MDU 202. This can be achieved by closing the respective power switches 17, so that the respective unit will distribute electric power to the next unit if the switch is closed. In the normal operating state of the subsea electrical system 200, one of the units 101 to 104 will have an open power switch 17, thus breaking the chain.

Each subsea terminating device 201, 202 comprises a LIM 25, 26, respectively, which is coupled to the electric power connection towards the next subsea electrical unit. The devices 201 and 202 can be configured so that in normal operation, the LIM 25, 26 is in an online mode and thus monitors the integrity of the electric power connections up to the position at which a power switch 17 is open. Any insulation failure or earth leakage occurring along the electrical connection formed by closing the power switches 17 up to the point at which the chain is broken will be sensed by the respective LIM 25, 26, so that a safe operation is ensured. Since the LIMs 21, 22 in the remaining subsea electrical units 101 to 104 will be inactive on the connections on which electric power is present, there will be no interference with the measurements taken by LIMs 25 and 26. An accurate and energy efficient monitoring of the integrity of the electrical connections thus becomes possible.

Note that in some embodiments, the LIMs 25, 26 of the subsea terminating devices 201, 202 may be permanently coupled to the respective electric power connections, while in other embodiments, they may have a configuration similar to the LIMs 21, 22 of the subsea electrical unit 100, i.e. the devices 201, 202 may comprise a control unit which can be configured to disconnect the LIM 25, 26 from the electric power connection and from the power supply in certain situations, e.g. when operating an LIM from a topside installation or the like.

Figure 6:
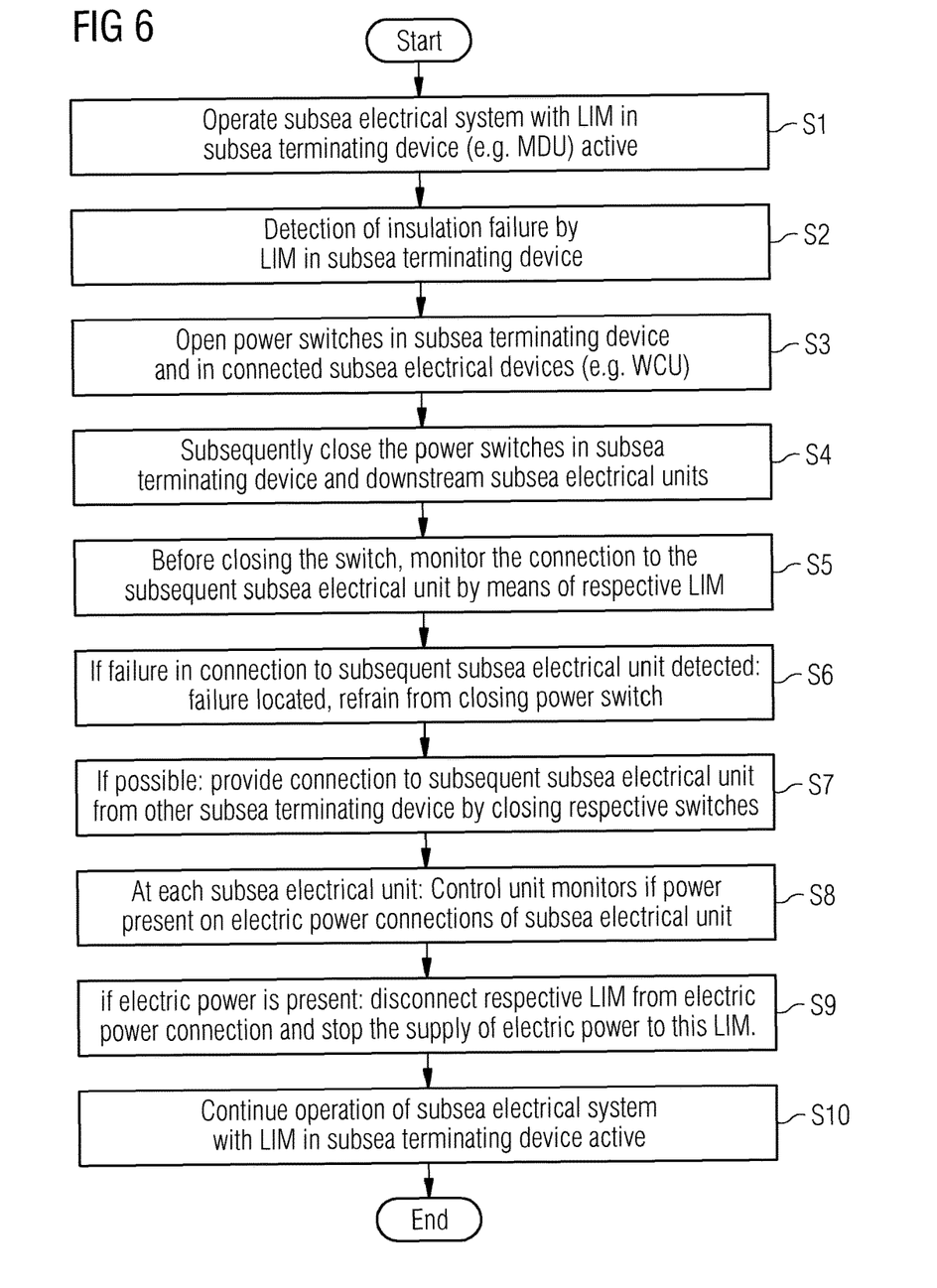
FIG. 6 is a flow diagram illustrating a method according to an embodiment of the invention.

A method of operating the subsea electrical units 101 to 104 and the subsea electrical system 200 will be described hereinafter with respect to FIGS. 3 and 6. In a first step S1, the subsea electrical system 200 is operated with the LIMs 25, 26 in the subsea terminating devices 201, 202 in an active state, i.e. taking line insulation measurements. In such normal operation, the units 101 and 102 may for example be supplied with electric power via the device 201, and the units 103 and 104 may by supplied with electric power via the device 202. In step S2, an insulation failure is detected by the LIM 25 of the subsea terminating device 201, and the power switches of the device 201 and the units 101, 102 are opened in response to detecting the failure in order to isolate the failure and prevent damage to any devices (step S3). Units 101 and 102 are now cut off from the power supply. By way of LIM 25, the integrity of the electric power connection towards unit 101 can be monitored. If the integrity is given, power switch 17 of device 201 can be closed, thereby supplying device 101 with electric power. LIM of device 101 can now monitor the integrity of the electric power connection towards the unit 102, while the switch 17 of unit 101 remains open. If the integrity is given, the switch 17 of unit 101 can be closed and electric power can be supplied to unit 102. The LIMs 21 and 22 would in such situation be disconnected from the electric power connections of the device 101 by way of control unit 30. Continuing in this way, the location of the failure which was detected by LIM 25 can be determined, and the corresponding section can be isolated (steps S4 and S5).

If for example the LIM 22 of unit 101 detects the presence of the failure in the electric power connection towards unit 102 the power switch 17 of unit 101 will not be closed (step S6). The LIM 21 of unit 104 can now be used for monitoring the integrity of the electric power connection towards unit 102. If the integrity is given, power switch 17 of unit 104 can be closed, and unit 102 can in this way be supplied with electric power (step S7). In consequence, the failure located between units 101 and 102 can be isolated, and the subsea electrical system 200 can continue operation with all units 101 to 104 being supplied with power and operational. Throughout the process, the control unit 30 of each subsea electrical unit 101 to 104 monitors if power is present on the respective electric power connections and in the affirmative, deactivates the LIMs 21, 22 coupled to the respective electric power connections (step S8). Also, as mentioned above, the supply with electric power to the respective LIMs is stopped (step S9). Operation of the subsea electrical system 200 can thus continue with the LIMs 25, 26 of the subsea terminating devices 201 and 202 being active and accurately measuring the integrity of the electric power connections without interference from the LIMs 21, 22 of the units 101 to 104 (step S10).

Figure 3:
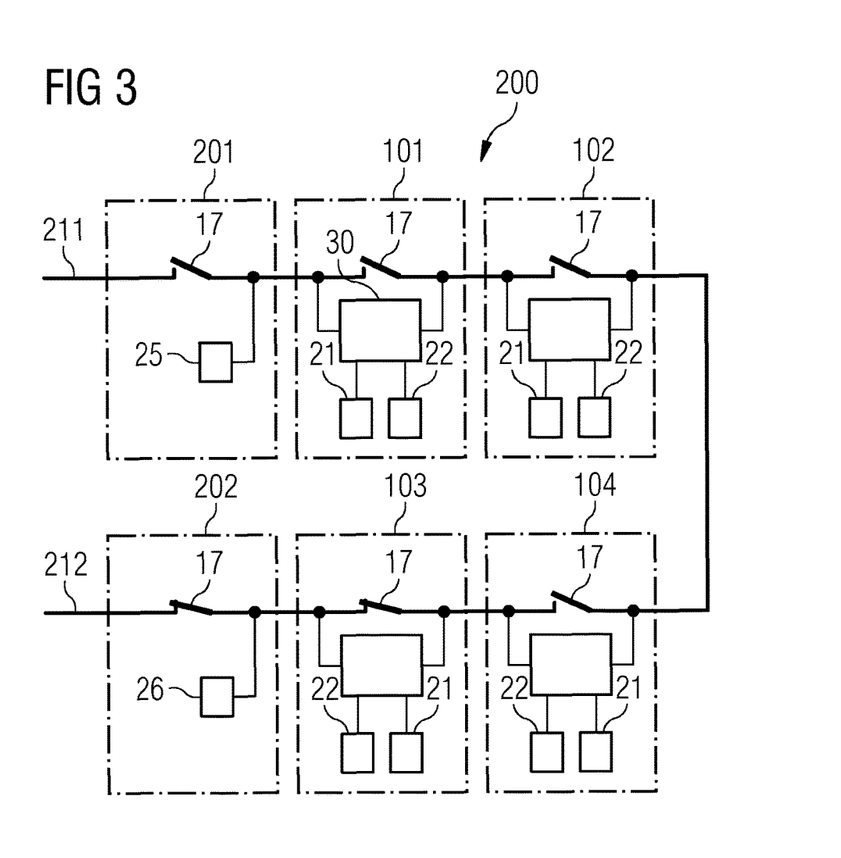
FIG. 3 is a schematic block diagram illustrating a switching state of a subsea electrical system in accordance with an embodiment of the invention.

It should be noted that FIGS. 2 and 3 only show simplified schematic representations of the subsea units and devices. As an example, further connections can be provided between the devices and the units, such as communication connections. In other embodiments, communication may occur via the power lines, for example via the electric power connections 210.

Figure 4:
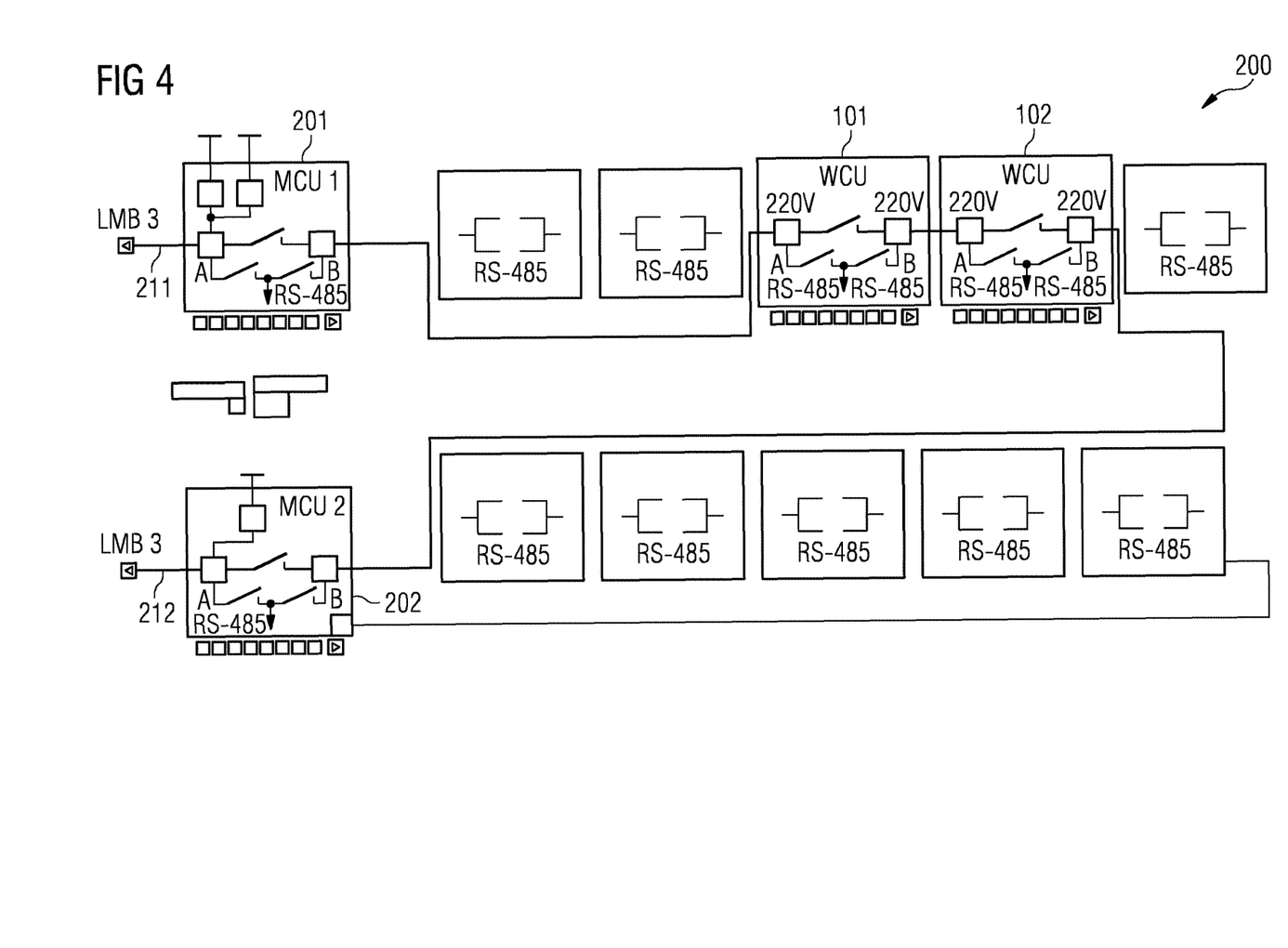
FIG. 4 is a schematic block diagram illustrating a subsea electrical system according to a further embodiment of the invention.

A further embodiment of the subsea electrical system 200 is shown in FIG. 4. In this example, two further switches are illustrated in the subsea terminating devices (in particular MDUs) 201 and 202 and in the subsea electrical units (in particular WCUs) 101 and 102. These switches are for communication, they enable a power line communication via the electric power connections.

Figure 5:
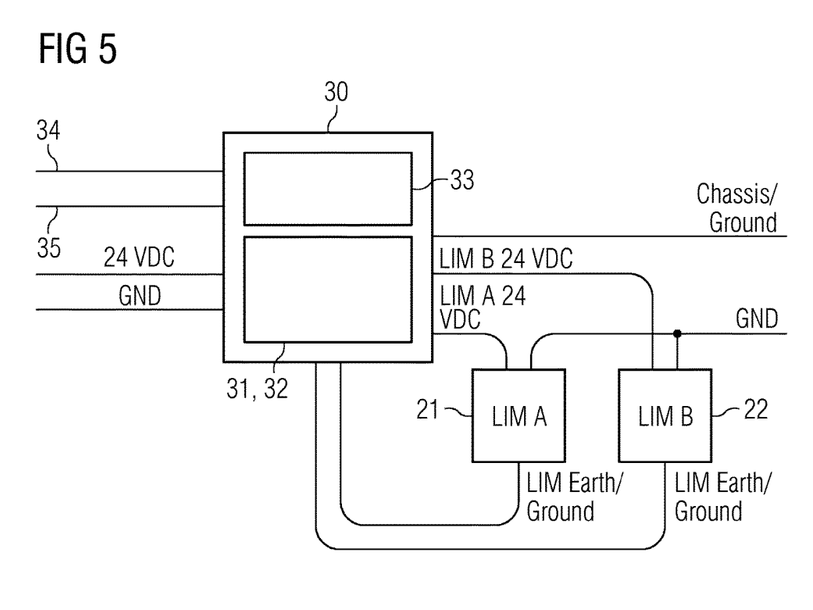
FIG. 5 is a schematic block diagram illustrating a subsea electrical unit according to a further embodiment of the invention.

FIG. 5 illustrates a further embodiment of how the control unit 30 may be implemented in the subsea electrical units 100 to 104. The control unit 30 comprises power sense circuitry 33 and relay circuitry 31, 32. The two LIMs 21, 22 receive DC electric power from the control unit 30, and are furthermore connected to common ground. The connection LIM earth/ground of the LIMs 21, 22 is switched via the relay circuitry 31, 32, so as to connect or disconnect the LIMs 21, 22 from the electric power connection to be monitored. Power sensing inputs 34 and 35 are used determine the presence of electric power on the electric power connections 11 and 12, respectively. Operation of the control unit 30 and of the LIMs 21, 22 can be similar to the operation described with respect to FIG. 1, so the explanations given above are equally applicable to the embodiment of FIG. 5.

As can be seen from the above description, the embodiments of the subsea electrical unit, subsea electrical system and corresponding operating methods achieve an accurate monitoring for insulation failures by the LIMs in the subsea terminating devices and/or the subsea electrical units. At the same time, the power consumption in the subsea electrical units can be reduced. In consequence, the production of waste heat can be reduced, so that problems related to heat dissipation within the subsea electrical units can be mitigated.

While specific embodiments are disclosed herein, various changes and modifications can be made without departing from the scope of the invention. The present embodiments are to be considered in all respects as illustrative and non-restrictive, and all changes coming within the meaning and equivalency range of the appended claims are intended to be embraced therein.

The invention claimed is:

1. A subsea electrical unit, comprising:
    a first electric power connection to receive electric power for operating the subsea electrical unit;
    a second electric power connection towards a further subsea electrical unit;
    a line insulation monitor coupled to the second electric power connection;
    a further line insulation monitor coupled to the first electric power connection; and a control unit adapted to determine whether electric power is present on the first electric power connection and whether electric power is present on the second electric power connection, wherein the control unit is adapted to disconnect the line insulation monitor from the second electric power connection upon determining that electric power is present on the second electric power connection and to disconnect the further line insulation monitor from the first electric power connection upon determining that power is present on the first electric power connection, wherein the control unit includes a first power sensing circuit for measuring the presence of electric power on the first electric power connection and a second power sensing circuit for measuring the presence of electric power on the second electric power connection.

2. The subsea electrical unit of claim 1, wherein disconnecting the line insulation monitor from the second electric power connection comprises disconnecting the line insulation monitor from a ground line of the second electric power connection.

3. The subsea electrical unit of claim 1, wherein the control unit is further adapted to stop the supply of operating power to the line insulation monitor upon determining that power is present on the second electric power connection.

4. The subsea electrical unit of claim 1, wherein the control unit comprises a switch, connected between the second electric power connection and the line insulation monitor, the control unit being adapted to open the switch upon determining that electric power is present on the second electric power connection.

5. The subsea electrical unit of claim 1, wherein the subsea electrical unit comprises a power switch to connect the first electric power connection to the second electric power connection.

6. The subsea electrical unit of claim 1, wherein the first electric power connection and the second electric power connection each connect to a further one of a plurality of subsea electrical units and are each configured to transmit electrical power between the subsea electrical unit and a respective one of the further subsea electrical units.

7. The subsea electrical unit of claim 4, wherein either
the control unit further comprises an additional power sensing circuit for measuring the presence of electric power on at least one of the first and second electric power connection or
the control unit is further configured to determine the presence of electric power on at least one of the first and second electric power connection by determining the switching state of switches within the control unit.

8. The subsea electrical unit of claim 1, wherein the subsea electrical unit is a subsea control unit configured to receive electric power on one of the first and second electric power connections and to supply electric power via the other of the first and second electric power connections.

9. The subsea electrical unit of claim 2, wherein the control unit is further adapted to stop the supply of operating power to the line insulation monitor upon determining that power is present on the second electric power connection.

10. The subsea electrical unit of claim 4, wherein the switch is a relay.

11. The subsea electrical unit of claim 2, wherein the first electric power connection and the second electric power connection each connect to a further one of a plurality of subsea electrical units and are each configured to transmit electrical power between the subsea electrical unit and a respective one of the further subsea electrical units.

12. The subsea electrical unit of claim 6, wherein the control unit is configured to determine the presence of electric power on at least one of the first and second electric power connection by determining a switching state of switches within at least one of the subsea electrical unit and one or more further subsea electrical units connected thereto.

13. The subsea electrical unit of claim 8, wherein the subsea control unit is a subsea well control unit (WCU).

14. A subsea electrical system, comprising:
at least a first and a second subsea electrical unit of claim 1; and
a subsea cable or hose connecting the at least first and second subsea electrical units, the subsea cable or hose providing the second electric power connection of the first subsea electrical unit and the first electric power connection of the second subsea electrical unit.

15. The subsea electrical system of claim 14, further comprising at least one subsea terminating device including an electrical connection to a power source in form of a subsea cable, a subsea hose or an umbilical, the first electrical power connection of the first subsea electrical unit being connected to the subsea terminating device to receive electrical power from the power source.

16. The subsea electrical system of claim 15, wherein at least the first and the second subsea electrical units are connected in series between the first subsea terminating device and a second subsea terminating device, the subsea electrical units being configured to enable a supply of electric power to each subsea electrical unit from either the first or the second subsea terminating device.

17. The subsea electrical system of claim 10, wherein the subsea terminating device includes a line insulation monitor coupled to the first electrical power connection of the first subsea electrical unit, the line insulation monitor being configured to be operable online while subsea electrical units which are electrically connected to the subsea terminating device receive electrical power via the subsea terminating device and the respective electric power connections.

18. A method of operating a subsea electrical unit, the subsea electrical unit including a first electric power connection for receiving electric power, a second electric power connection towards a further subsea electrical unit, and a line insulation monitor connected to the second electric power connection, the method comprising:
receiving power on the first electric power connection for operating the subsea electrical unit;
determining if electric power is present on the second electric power connection;
disconnecting, upon determining that electric power is present on the second electric power connection, the line insulation monitor from the second electric power connection;
wherein the method is performed by a subsea electrical system including at least a first and a second subsea electrical unit; a subsea cable or hose connecting the at least first and second subsea electrical units, the subsea cable or hose providing the second electric power connection of the first subsea electrical unit and the first electric power connection of the second subsea electrical unit; and at least one subsea terminating device including an electrical connection to a power source in form of a subsea cable, a subsea hose or an umbilical, the first electrical power connection of the first subsea electrical unit being connected to the subsea terminating device to receive electrical power from the power source, wherein the subsea terminating device includes a line insulation monitor coupled to the first electrical power connection of the first subsea electrical unit, the line insulation monitor being configured to be operable online while subsea electrical units which are electrically connected to the subsea terminating device receive electrical power via the subsea terminating device and the respective electric power connections, the method further comprising:

operating the subsea electrical system with the line insulation monitor of the subsea terminating device being online;

disconnecting, upon detecting a failure by the line insulation monitor of the subsea terminating device, each of the subsea electrical units from the subsea terminating device by opening respective switches in the subsea terminating device and the subsea electrical units;

re-connecting the subsea electrical units to the subsea terminating device by connecting each subsea electrical unit one after the other, starting with the subsea electrical unit closest to the subsea terminating device and continuing downstream; and using, before re-connecting a subsea electrical unit, the line insulation monitor of the subsea terminating device or of the subsea electrical unit arranged upstream of the subsea electrical unit to be re-connected to check the electric power connection towards the subsea electrical unit to be re-connected for a failure.

19. The method according to claim 18, further comprising:

disconnecting, upon determining that electric power is present on the second electric power connection, the power supply to the line insulation monitor.

* * * * *